United States Patent [19]

Brinkmoeller

[11] Patent Number: 5,123,041
[45] Date of Patent: Jun. 16, 1992

[54] APPARATUS FOR TESTING TELEPHONE CABLES

[75] Inventor: David J. Brinkmoeller, White Plains, N.Y.

[73] Assignee: New York Telephone Company, New York, N.Y.

[21] Appl. No.: 703,500

[22] Filed: May 21, 1991

[51] Int. Cl.⁵ .............................................. H04M 3/30
[52] U.S. Cl. ......................................... 379/21; 379/27; 379/29
[58] Field of Search .................. 379/19, 21, 22, 27, 379/29

[56] References Cited

U.S. PATENT DOCUMENTS

| | | | |
|---|---|---|---|
| 3,736,387 | 5/1973 | Thompson et al. | 179/175 |
| 3,736,388 | 5/1973 | Thompson et al. | 179/175 |
| 4,575,840 | 5/1986 | Hargrave et al. | 370/13 |
| 4,583,215 | 4/1986 | Hargrave et al. | 370/13 |
| 4,991,196 | 2/1991 | Krebs | 379/21 X |

Primary Examiner—Stafford D. Schreyer
Attorney, Agent, or Firm—Douglas J. Kirk; John J. Torrente

[57] ABSTRACT

An access and test apparatus for subscriber and central office cable pairs connected to associated socket pairs in a main frame in which the apparatus includes a body member and pairs of connecting terminals extending from the body member for receipt in the socket pairs and first and second switch means in the body member for selectively interconnecting the connecting terminals and, therefore, sockets and cable pairs to first and second access terminals, as well as to selectively provide short circuit and open circuit conditions to the connecting terminals and, hence, sockets and cable pairs.

18 Claims, 2 Drawing Sheets ns,041

APPARATUS FOR TESTING TELEPHONE CABLES

BACKGROUND OF THE INVENTION

This invention relates to apparatus for accessing telephone cable pairs and, in particular, to apparatus for accessing subscriber cable pairs and central office cable pairs at a telephone central office.

Many telephone central offices employ so-called "main distributing frames" as wiring support structures for interconnecting the subscriber cable pairs incoming to the central office and the central office cable pairs connected to the central office switching equipment. Typically, main distributing frames in use today comprise groups of vertically and horizontally oriented terminal blocks. The vertical terminal blocks interconnect the incoming subscriber cable pairs (Tip and Ring) with the associated central office cable pairs. The latter, in turn, also connect to the horizontal terminal blocks. So called cross-connects then connect the horizontal terminal blocks to the telephone switching equipment. As a result, a link is established between the subscriber cable pairs and the switching equipment.

The vertical terminal blocks of the main distributing frame generally contain groups of sockets arranged in rows and columns. For example, there may be five groups in a row and twenty groups in a column to provide one hundred groups of sockets.

In each group of sockets, a first pair of sockets connect with a subscriber cable pair and a second group of sockets connect with a central office cable pair. A further socket connects with ground. Each socket group then receives a lightning or surge protector module. The latter protectively interconnects the first and second socket pairs and, hence, the associated subscriber and central office cable pairs.

Because of the many cable pairs handled by a main distributing frame and its terminal blocks there is a dense packing of blocks and cables. This makes it extremely difficult to gain access to the interconnected cable pairs for testing by telephone personnel. Also, since the cables in many central offices have been in place for many years, there is a likelihood that they are brittle and, hence, may require care in handling during any testing procedure.

Present day devices used to access and test cable pairs at the main distributing frame generally use a fragile test cord which has a short lifespan and, thus, must be frequently replaced. This increases the cost of the testing procedure. An alternative more bulky test cord may also be used, but it is cumbersome and, thus, ineffective and wasteful of time.

It is, therefore, an object of the present invention to provide an apparatus which can be easily used by telephone personnel to access and/or test cable pairs at the main distributing frame of a telephone central office.

It is a further object of the present invention to provide an apparatus meeting the aforesaid objective and which is also of relatively simple construction.

SUMMARY OF THE INVENTION

In accordance with the principles of the present invention, the above and other objectives are realized in an apparatus comprising a body member which supports first and second pairs of connecting terminals which extend outwardly of the body member. The body member also supports first and second access terminals and houses first and second switch means. Each switch means has selection means accessible from outwardly of the body member for selecting a first or second connecting state of the switch means.

The first and second switch means are further electrically interconnected and arranged such that in the first connecting state of the first switch means the first pair of connecting terminals are connected to the first and second access terminals and in the second connecting state of the first switch means the second pair of connecting terminals are connected to the first and second test terminals. Furthermore, in the first connecting state of the second switch means, a short circuit condition is established across the first and second access terminals and in a second connecting state an open circuit condition is established across these terminals.

With the apparatus of the invention configured as aforesaid, insertion of the first and second pairs of connecting terminals into first and second socket pairs of a socket group in a main distributing frame permits selective access to and testing of the subscriber pair and central office cable pair connected to the sockets. This is accomplished by appropriate activation of the switch selection means of the first and second switches.

In a further aspect of the invention, the apparatus is further provided with additional contact terminals which can also be electrically connected to the first and second pair of access terminals. This enables the access terminals to be coupled to cable pair points in order to monitor whether a cable pair is active and so as to prevent the protector serving an active cable pair from being removed from its socket group.

BRIEF DESCRIPTION OF THE DRAWINGS

The above and other features and aspects of the present invention will become apparent upon reading the following detailed description in conjunction with the accompanying drawings; in which.

DETAILED DESCRIPTION

Figure 1:
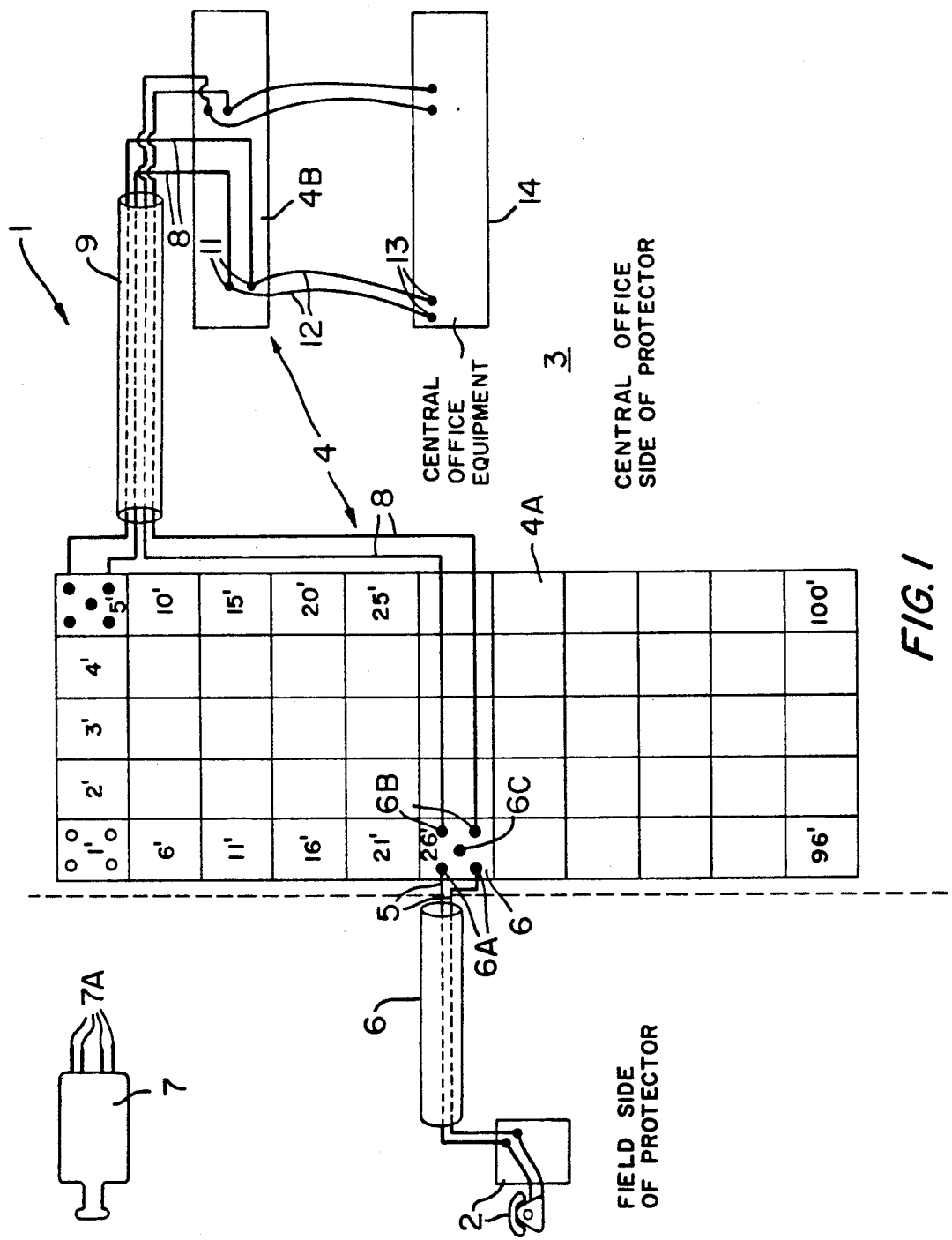
FIG. 1 shows schematically a telephone system including subscriber and central, office cable pairs with which the testing apparatus of the present invention can be used.

FIG. 1 shows schematically a telephone system 1 comprising subscribers 2 and a central office 3. The central office 3 includes a main distributing 4, as above-described, for interconnecting the subscriber cable pairs 5 carried by the subscriber cables 5A to the switching and other equipment 14 in the central office.

More particularly, a single vertical block 4A of the frame 4 is illustrated in FIG. 1. As shown, this block is organized to provide interconnection of a number n, shown as 100, of incoming subscribers 2 via their respective subscriber cable pairs 5, to the central office equipment. To this end, the vertical block 4A is segmented into n socket groups 6. Each socket group 6 comprises first and second pairs 6A and 6B of female sockets and a central female ground socket 6C. Each socket group 6 is further adapted to receive a protector, shown as fuse 7, whose male terminals or pins 7A are received in the sockets of the socket group. This provides electrical connection of the first socket pair 6A of a socket group 6 with the second socket pair 6B of the group.

Each socket pair 6A, in turn, is electrically connected to a subscriber cable pair 5, while each socket pair 6B is connected to a central office cable pair 8. Thus each fuse 7, when inserted into its respective socket group 6, protectively interconnects the subscriber cable pair 5 and the central office cable pair 8 connected to the socket group.

The cable pairs 8 are carried in an n pair cable 9 to a horizontal block 4B of the distributing frame 4. The block 4B has respective contact terminals 11 for each cable pair 8. Cross connections 12 then electrically connect the terminals 11 to terminals 13 of the central office equipment 14. This completes the interconnection of each subscriber 2 to the latter equipment.

In the system 1, it is often desired that telephone company personnel be permitted to access the subscriber and telephone cable pairs 5 and 8 for testing and monitoring purposes. In accordance with the present invention, a testing apparatus 21 is provided for this purpose which is simple to use and which when in use does not compromise the integrity of the cable pairs being accessed.

Figure 2:
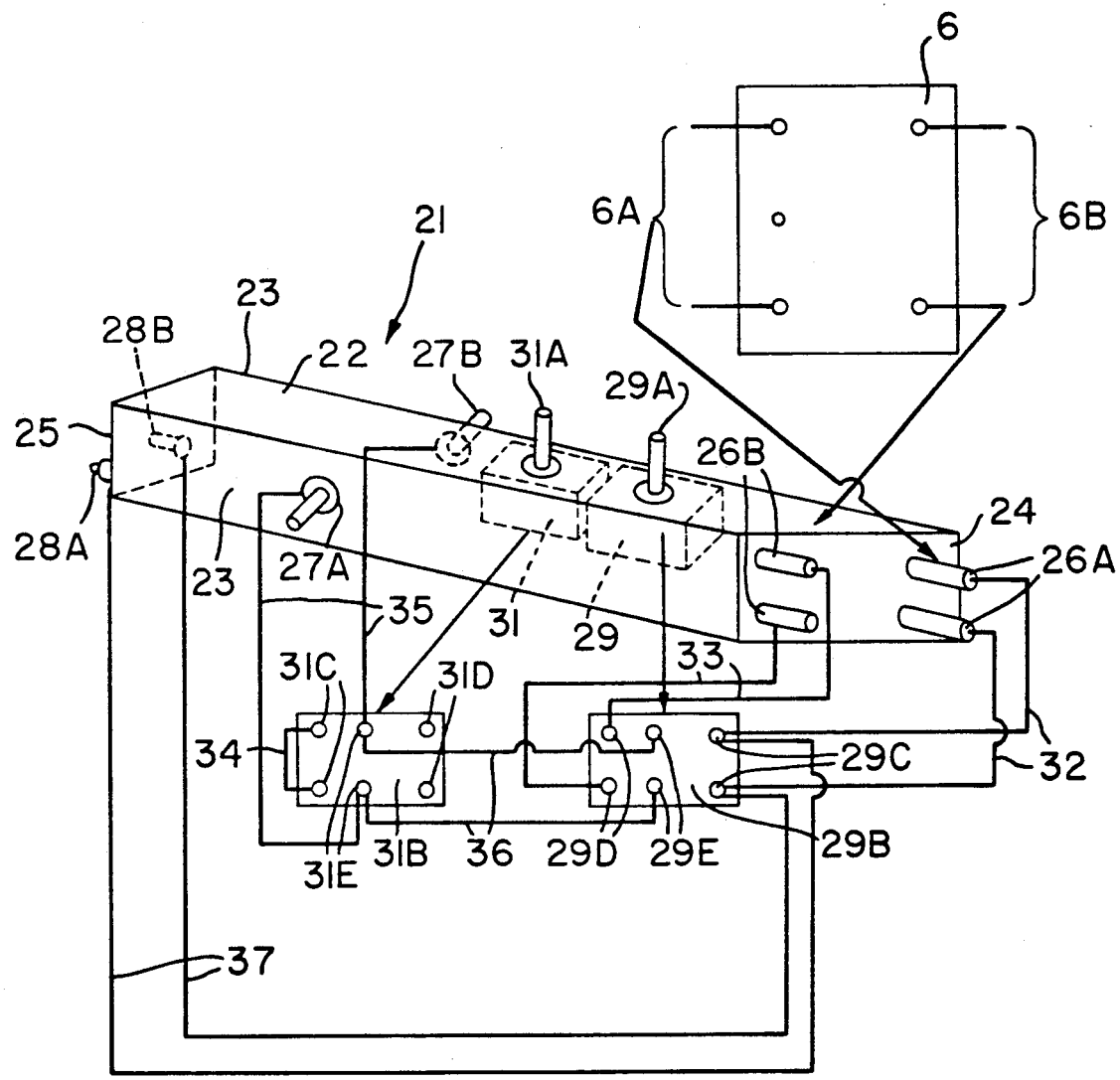
FIG. 2 shows a testing apparatus in accordance with the principles of the present invention.

More particularly, FIG. 2 shows schematically the details of the testing apparatus 21. As illustrated, the apparatus 21 comprises a body member 22, depicted as rectangular, having side walls 23 and front and back walls 24 and 25. Extending outwardly of the front wall 24 are first and second pairs of connecting terminals 26A and 26B which are arranged so as to be receivable in the socket pairs 6A and 6B, respectively, of a socket group 6. Also accessible along the side walls 23 of the body member 22 are first and second access terminals 27A and 27B. Extending from the back wall 25 of the member 22 are a pair of contact terminals 28A and 28B.

Disposed within the body member 22 are respective switches 29 and 31 which provide selective interconnection of the connecting terminal pairs 26A and 26B and the contact terminals 28A and 28B with the first and second access terminals 27A and 27B. The switches 29 and 31 also permit selective application of short and open circuit conditions to the test terminals. Switch selection means (shown as toggles 29A and 31A) on the switches 29 and 31 allow this selective interconnection by placing their respective switches in first and second connecting states, as will be discussed in more detail below.

The connection of the switches 29 and 31 to the connecting, contact and access terminals of the body member 29 is illustrated schematically in FIG. 2 by the respective connecting blocks 29B and 31B of the switches. These blocks contain the contact points of the switches and show how these contact points are connected to the respective terminals.

More particularly, as shown, the contact block 29A of switch 29 includes three pairs of contacts 29C, 29D and 29E. The contacts 29B are connected by lines 32 to the terminals of the terminal pair 26A and the contacts 29D are connected by lines 33 to the terminals of the terminal pair 26B. The contacts 29E, in turn, can be connected either to the contacts 29C or 29D by operation of toggle 29A. The former condition corresponds to the first connecting state for the switch 29 and the latter condition to the second connecting state.

The contact block 31B of the switch 31 also has three pairs of contacts 31C, 31D and 31E. The contacts 31C are shorted circuited by line 34, while the contacts 31D are disconnected or open-circuited The contacts 31E are connected by a first set of lines 35 to access terminals 27A and 27B and by a second set of lines 36 to the contacts of contact pair 29E of the switch 29. The toggle 31A, furthermore, permits the contact pair 31E to be connected to either the contact pair 31C or 31D, corresponding to the first and second connecting states of the switch 31.

As previously indicated, with the switches 29 and 31 arranged and electrically connected as above-described, the switches enable various interconnection between the pairs of connecting terminals 26A, 26B and the access terminals 27A, 27B, as well as various conditions to be established across the latter terminals. Thus, in the first connecting state of the switch 29, the pair of connecting terminals 26A are connected to the access terminals 27A and 27B, respectively. In the second connecting state of the switch 29, the pair of connecting terminals 26B are connected to the respective access terminals. Furthermore, in the first and second connecting states of the second switch 31, the switch 31 establishes short circuit and open circuit conditions across the access terminals and, thus, the respective connecting terminal pair 26A or 26B to which the access terminals are connected.

The test apparatus 1 of the invention thus permits separate access to the connecting terminal pairs 26A and 26B as well as placement of short-circuit and open circuit conditions across these terminals pair. Accordingly, by inserting the terminal pairs 26A and 26B into the socket pairs 6A and 6B of a socket group 6, the test apparatus permits separate access via access terminals 27A and 27B to the subscriber cable pair 5 and the central office cable pair 8 connected to the respective sockets 6A and 6B. This is accomplished simply by switching the switch means 29 between its first and second states. Similarly, by switching switch means 31 between its first and second states, short circuit and open circuit test conditions can now also be applied to these cable pairs during such accessing. The test apparatus 1 thus provides a simple, hand holdable unit which can be readily used to test cable pairs. This also can be accomplished without disturbing the cable pairs, since access is through the sockets 6.

Before a protector fuse 7 is removed from a socket group 6 for connecting the apparatus 1, it is desirable to first pretest the subscriber cable pair to make sure a call is not in progress. The apparatus 1 is adapted to permit this via the contact terminals 28A and 28B which are connected by lines 37 to the contact points 29C. Thus, by placing the switch 29 in its first state, the contact terminals 28A and 28B are connected to test terminals 27A and 27B. Accordingly, if the contact terminals are now placed across points in the central office connected to a particular subscriber pair, access to the subscriber pair can now be had through the more conveniently located test terminals 27A and 27B.

In implementing the apparatus 1 of the invention, each of the switch means 29 and 31 can be formed from a conventional double pole double throw switch. The connecting, access and contact terminals can, furthermore, be implemented by elongated pin-members or like terminals.

In all cases, it is understood that the above-identified arrangements are merely illustrative of the many possible specific embodiments which represent applications of the present invention. Numerous and varied other arrangements can readily be devised in accordance with the principles of the present invention without departing from the spirit and scope of the invention.

What is claimed is:

1. Apparatus for use in selectively accessing for testing a subscriber cable pair and an associated telephone central office cable pair, said subscriber cable pair and said associated telephone central office cable pair being electrically connected, respectively, to first and second pairs of terminal sockets in a central office frame, said pairs of terminal sockets being adapted to receive a protection device for electrically connecting the first and second pairs of sockets and, therefore, the subscriber and central office cable pairs, the apparatus comprising:

an elongated body member;

first and second pairs of connecting terminals extending from said body member and adapted to be received by said first and second pairs of sockets, respectively;

a pair of access terminals carried by said body member and accessible from outwardly of said body member;

and first and second switch means disposed within said body member and each having switch selection means accessible from outwardly of said body member for selecting a first or second connecting state of said switch means, said first and second switch means being electrically interconnected and arranged such that in said first connecting state of said first switch means the terminals of said first pair of connecting terminals are electrically connected to said first and second access terminals, respectively, and in a second connecting state of said first switch means the terminals of said second pair of connecting terminals are electrically connected to said first and second access terminals, respectively, and in a first connecting state of said second switch means a short circuit condition is established across said pair of access terminals and in a second connecting state of said second switch means an open circuit condition is established across said pair of access terminals.

2. Apparatus in accordance with claim 1 further comprising:

a pair of contact terminals extending from said body member, the terminals of said pair of contact terminals being electrically connected to the respective terminals of said first pair of connecting terminals.

3. Apparatus in accordance with claim 2 wherein:
said body member has a front wall;
said first and second pair of connecting terminals extend outwardly from said front wall.

4. Apparatus in accordance with claim 3 wherein:
said body member has a back wall;
and said pair of contact terminals extend outwardly from said back wall.

5. Apparatus in accordance with claim 4 wherein:
said body member has a side wall;
and said pair of test terminals are accessible at said side wall.

6. Apparatus in accordance with claim 5 wherein:
each of said connecting, contact and test terminals comprises a pin extending outwardly of said body member.

7. Apparatus in accordance with claim 5 wherein:
said first switch means further comprises: first, second and third pairs of contact points; the contact points of said first pair of contact points being electrically connected to the respective terminals of said first pair of connecting terminals; the contact points of said second pair of contact points being electrically connected to the respective terminals of said second pair of connecting terminals; the switch selection means of said first switch means electrically connecting said first pair of contact points to said third pair of contact points in said first connecting state of said first switch means and the switch selection means of said first switch means electrically connecting said second pair of contact points to said third pair of contact points in said second connecting state of said first switch means;

and said second switch means further comprises: fourth, fifth and sixth pairs of contact points; the contact points of said fourth pair of contacts being electrically connected to each other; the contacts of said fifth pair of contact points being electrically disconnected from each other; the contact points of said sixth pair of contact points being electrically connected to the respective contact points of said third pair of contact points and to the respective terminals of said pair of access terminals; said switch selection means of said second switch connecting said sixth pair of contact points to said fourth pair of contact points in said first connecting state of said second switch means and said switch selection means of said second switch connecting said sixth pair of contact points to said fifth pair of contact points in said second connecting state of said second switch means.

8. Apparatus in accordance with claim 7 wherein:
the terminals of said pair of contact terminals are electrically connected to the respective contact points of said first pair of contact points.

9. Apparatus in accordance with claim 7 wherein:
each of said switch means is a double pole double throw switch.

10. A method for use in selectively accessing for testing a subscriber cable pair and an associated telephone central office cable pair, said subscriber cable pair and said associated telephone central office cable pair being electrically connected, respectively, to first and second pairs of terminal sockets in a central office frame, said pairs of terminal sockets being adapted to receive a protection device for electrically connecting the first and second pairs of sockets and, therefore, the subscriber and central office cable pairs, the method comprising:

inserting first and second pairs of connecting terminals extending from a body member into said first and second pairs of sockets, respectively;

and selecting via respective first and second switch selection means accessible from outwardly of said body member and forming part of respective first and second switch means disposed within said body member, a first or second connecting state of each of said first and second switch means, said first and second switch means being electrically interconnected and arranged such that in said first connecting state of said first switch means the terminals of said first pair of connecting terminals are electrically connected to respective first and second access terminals carried by said body member and accesible from outwardly of said body member and in a second connecting state of said first switch means the terminals of said second pair of connecting terminals are electrically connected to said first and second access terminals, respectively, and in a first connecting state of said second switch means a short circuit condition is established across said pair of access terminals and in a second connecting state of said second switch means an open circuit condition is established across said pair of access terminals.

11. A method in accordance with claim 10 wherein:
a pair of contact terminals extend from said body member, the terminals of said pair of contact terminals being electrically connected to the respective terminals of said first pair of connecting terminals.

12. A method in accordance with claim 11 wherein:
said body member has a front wall;
said first and second pair of connecting terminals extend outwardly from said front wall.

13. A method in accordance with claim 12 wherein:
said body member has a back wall;
and said pair of contact terminals extend outwardly from said back wall.

14. A method in accordance with claim 13 wherein:
said body member has a side wall;
and said pair of test terminals are accessible at said side wall.

15. A method in accordance with claim 14 wherein:
each of said connecting, contact and test terminals comprises a pin extending outwardly of said body member.

16. A method in accordance with claim 14 wherein:
said first switch means further comprises: first, second and third pairs of contact points; the contact points of said first pair of contact points being electrically connected to the respective terminals of said first pair of connecting terminals; the contact points of said second pair of contact points being electrically connected to the respective terminals of said second pair of connecting terminals; the switch selection means of said first switch means electrically connecting said first pair of contact points to said third pair of contact points in said first connecting state of said first switch means and the switch selection means of said first switch means electrically connecting said second pair of contact points to said third pair of contact points in said second connecting state of said first switch means;

and said second switch means further comprises: fourth, fifth and sixth pairs of contact points; the contact points of said fourth pair of contacts being electrically connected to each other; the contacts of said fifth pair of contact points being electrically disconnected from each other; the contact points of said sixth pair of contact points being electrically connected to the respective contact points of said third pair of contact points and to the respective terminals of said pair of access terminals; said switch selection means of said second switch connecting said sixth pair of contact points to said fourth pair of contact points in said first connecting state of said second switch means and said switch selection means of said second switch connecting said sixth pair of contact points to said fifth pair of contact points in said second connecting state of said second switch means.

17. A method in accordance with claim 16 wherein:
the terminals of said pair of contact terminals are electrically connected to the respective contact points of said first pair of contact points.

18. A method in accordance with claim 16 wherein:
each of said switch means is a double pole double throw switch.

* * * * *